Patented June 19, 1945

2,378,694

UNITED STATES PATENT OFFICE 2,378,694

POLYMERIZATION INITIATOR

Charles F. Fryling, Akron, Ohio, assignor, by mesne assignments, to The B. F. Goodrich Company, Akron, Ohio, a corporation of New York No Drawing. Application August 15, 1941, Serial No. 407,007

6 Claims. (Cl. 260—84.5)

This invention relates to the initiation of polymerization reactions, and particularly to the initiation of the polymerization of mixtures of butadiene-1,3 hydrocarbons and alpha-methylene nitriles in the form of aqueous emulsions.

It is well known that polymerization reactions may be initiated by hydrogen peroxide, potassium persulfate, benzoyl peroxide, and other oxygen-yielding compounds. The polymers obtained as the products of polymerizations performed in the presence of these initiators, however, are often insoluble, non-plastic materials which are made into cements or worked on a roll mill only with extreme difficulty. The vulcanizates prepared from such polymers exhibit low elongations and, in many cases, low tensile strengths.

I have discovered that polymers of improved properties are obtained by initiating the emulsion of copolymerization of butadiene-1,3 hydrocarbons and alphamethylene nitriles with peroxynitric acid, that is, the compound having the formula $HNO_4$. The preferred method of employing the initiator will be clear from the following example.

A peroxynitric acid solution was prepared by dissolving 3.5 g. of sodium nitrite in distilled water in a 100 cc. volumetric flask. 15 cc. of 30% hydrogen peroxide and 30 cc. of 10% (by weight) sulfuric acid were then added, and the mixture was diluted to 100 cc. A 2% solution of sodium lauryl sulfate was also prepared, and the pH was lowered to 4 by the addition of sulfuric acid. A mixture of 7.0 g. of butadiene and 3.0 g. of acrylonitrile was agitated at 40° C. with 25 cc. of the sodium lauryl sulfate and 2 cc. of the peroxynitric acid solution. At the end of 24 hours, a synthetic rubber latex was obtained which, upon coagulation, yielded a soft, plastic synthetic rubber. When the product was tested in a tire tread recipe, a vulcanizate exhibiting a maximum tensile strength of 5500 lb./in.² and a maximum elongation of 620% was obtained. The properties of the product both in a cured and uncured state were more satisfactory than those of polymers prepared in the presence of ordinary initiators.

It is not necessary that the peroxynitric acid be prepared and then added to the polymerization mixture, for hydrogen peroxide or other peroxides and a nitrite may be added to the batch and the peroxynitric acid formed in situ. The amount of peroxynitric acid employed is not critical and may be varied over a wide range from a fraction of a percent to several percent based on the polymerizable materials present.

When peroxynitric acid is employed as the initiator, the polymerization should be conducted under neutral or, preferably, under acid conditions because of the instability of the acid in alkaline solutions. A number of emulsifying agents which function under non-alkaline conditions are known such as hymolal sulfates, of which the sodium lauryl sulfate employed in the specific example is one, aryl sulfonates such as sodium isopropyl naphthalene sulfonate, and salts of organic bases containing long carbon chains such as the hydrochloride of dimethylaminoethyloleylamide, trimethylcetylammonium methyl sulfate, etc. The pH of the charge at the beginning of the polymerizatiton is preferably between 5 and 2.

Other butadiene-1,3 hydrocarbons, including butadiene-1,3, commonly termed butadiene, isoprene, piperylene, 2,3-dimethylbutadiene, and other homologues of butadiene-1,3 which enter into polymerization reactions in essentially the same manner, may be substituted entirely or in part for the butadiene in the specific example. Furthermore, other conjugated alpha-methylene nitriles of the formula

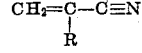

wherein R is a member of the class consisting of hydrogen and alkyl, such as acrylonitrile, alpha-methacrylonitrile, alpha-ethacrylonitrile, etc., may be substituted entirely or in part for the acrylonitrile employed in the specific examples. The alpha-methylene nitrile is preferably, but not necessarily, employed in an amount by weight smaller than the butadiene hydrocarbon, copolymers exhibiting the most desirable rubber-like properties being obtained from mixtures containing from 15% to 50% by weight of acrylonitrile. Copolymers containing a predominant amount of acrylonitrile may be prepared by the method of this invention and are valuable for specialized uses, the properties of the copolymers being in general resinous rather than rubber-like. Minor proportions of other monomers copolymerizable with butadiene hydrocarbons and alpha-methylene nitriles such as styrene, methyl methacrylate, methyl acrylate, etc., may also be present during the polymerization.

Peroxynitric acid may be employed in conjunction with other initiators of polymerization such as persulfates, perborates, percarbonates, and peroxides as well as other types of initiators such as diazoaminobenzene, dipotassium diazomethane disulfonate, and triphenylmethylazobenzene. The rate of polymerization may be increased by the use of heavy metal catalysts such as small proportions of heavy metal salts or heavy metal complexes with phosphates, aliphatic carboxylic acids, or sterols. The plasticity of the polymers may be further increased by the use of certain sulfur-containing compounds herein called modifiers, such as the dialkyl dixanthogens, the higher tetralkyl thiuram mono- and poly-sulfides, mercaptoalkylthiazoles, etc.

The employment of other procedures known to be useful in connection with emulsion polymerization is within the spirit and scope of the invention as defined in the appended claims.

I claim:

1. The method which comprises copolymerizing a butadiene-1,3 hydrocarbon and an alpha-methylene nitrile of the formula $$CH_2=C-C\equiv N$$
$$|$$
$$R$$

wherein R is a member of the class consisting of hydrogen and alkyl, in the form of an aqueous emulsion in the presence of peroxynitric acid having the formula $HNO_4$.

2. The method which comprises polymerizing butadiene-1,3 and an alpha-methylene nitrile of the formula $$CH_2=C-C\equiv N$$
$$|$$
$$R$$

wherein R is a member of the class consisting of hydrogen and alkyl, in the form of an aqueous emulsion in the presence of peroxynitric acid having the formula $HNO_4$.

3. The method which comprises copolymerizing butadiene-1,3 and a smaller amount of acrylonitrile in the form of an aqueous emulsion in the presence of peroxynitric acid having the formula $HNO_4$.

4. The method which comprises copolymerizing a butadiene-1,3 hydrocarbon and acrylonitrile in the form of an aqueous emulsion in the presence of peroxynitric acid having the formula $HNO_4$.

5. In a method of copolymerizing a butadiene-1,3 hydrocarbon and an alpha-methylene nitrile of the formula $$CH_2=C-C\equiv N$$
$$|$$
$$R$$

wherein R is a member of the class consisting of hydrogen and alkyl, in the form of an aqueous emulsion having a pH between 2 and 5, the step which comprises initiating the copolymerization by adding to the emulsion an aqueous solution of peroxynitric acid formed by the reaction of an alkali metal nitrite, a mineral acid and hydrogen peroxide.

6. In a method of copolymerizing a butadiene-1,3 hydrocarbon and an alpha-methylene nitrile of the formula $$CH_2=C-C\equiv N$$
$$|$$
$$R$$

wherein R is a member of the class consisting of hydrogen and alkyl in the form of an aqueous emulsion having a pH between 2 and 5, the step which comprises initiating the copolymerization by adding to the emulsion a nitrite and a peroxide.

CHARLES F. FRYLING.